C. MOSCHEL.
MOTOR CYCLE JACK.
APPLICATION FILED DEC. 7, 1916.

1,220,672. Patented Mar. 27, 1917.

Witnesses
Wm. Hust
Ed. Betz

Inventor.
Charles Moschel.
By Daniel K. Allison
Attorney.

UNITED STATES PATENT OFFICE.

CHARLES MOSCHEL, OF CINCINNATI, OHIO.

MOTOR-CYCLE JACK.

1,220,672.           Specification of Letters Patent.      Patented Mar. 27, 1917.

Application filed December 7, 1916. Serial No. 135,697.

*To all whom it may concern:*

Be it known that I, CHARLES MOSCHEL, a citizen of the United States, and resident of Cincinnati, county of Hamilton, and State of Ohio, have invented a new Motor-Cycle Jack, of which the following is a specification.

The object of my invention is to provide a tool which may be easily carried and which may be used to elevate and support the frame of a motor-cycle when it is necessary to repair it.

Figure 2:
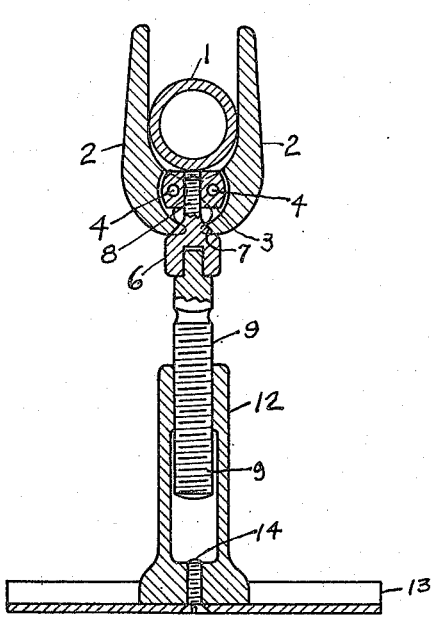
Figure 1:
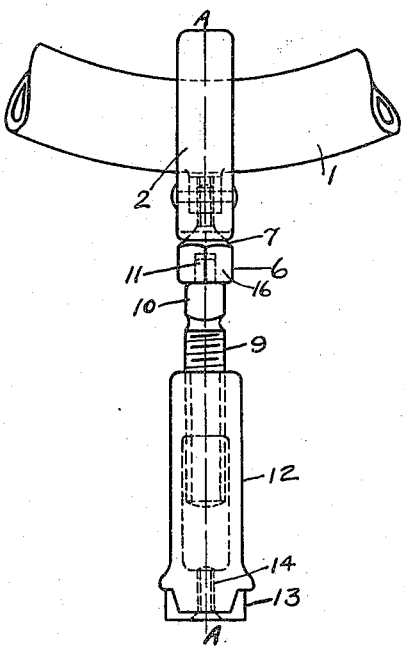
Figures 3, 6:
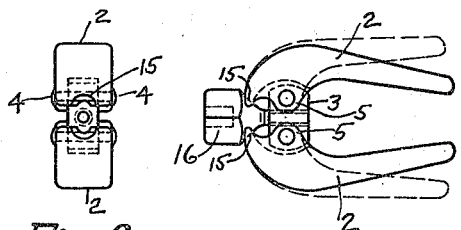
Figure 4:
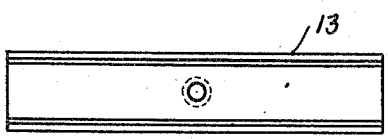
Figure 5:
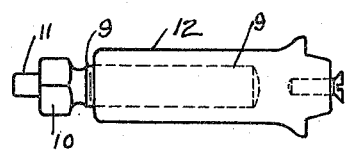

Referring to the drawings, Figure 1 represents an elevation of my invention. Fig. 2 is a vertical cross section taken on the line A—A of Fig. 1. Fig. 3 is an elevation of the upper part of my jack showing the clamping jaws 2—2 and parts connected thereto. Fig. 4 is a plan view of the bar 13. Fig. 5 is an elevation of the post 12. Fig. 6 is an end view of Fig. 3 with the cap 6 omitted. 1 represents a portion of the tubular frame of a motor-cycle at a point approximately midway between the wheels thereof. 2—2 represents clamping jaws pivotally connected to the nut 3 by the pins 4—4. The clamping jaws 2—2 have lugs 5—5 which are cut away in the center to provide space for the said nut 3. The cap 6 is provided with a conical portion 7 which terminates in the screw 8, which said screw fits in a suitable thread in the nut 3. The clamping jaws 2—2 are provided with projections 15—15 which are shaped at their extremities to fit the conical portion of cap 6 and engage therewith. The lower portion of said cap 6 is squared as indicated by 16 or otherwise suitably arranged to facilitate easy adjustment. 9 represents a screw which is provided with a square portion 10 and a projecting stud 11, which stud plays freely in a suitable hole in the bottom of cap 6. The threaded portion of screw 9 fits a corresponding thread in post 12. Post 12 is shaped at its lower extremity to fit the bar 13 and is secured thereto by the screw 14.

The manner in which my jack is applied is as follows:

Whenever it is necessary to repair a motor-cycle the herein described jack should be placed under the frame of the machine with its bar 13 extending crosswise of the machine and resting on the highway, wherever it may be. The clamping jaws 2—2 are opened into a position similar to that shown by dash lines in Fig. 3, which is accomplished by turning the cap 6 in a manner to withdraw screw 8 out of the nut 3. The clamping jaws are now placed into position similar to that shown in Figs. 1 and 2 whereby the frame of the motor-cycle may be clamped tightly by turning the cap 6 in a manner to cause the clamping jaws to close upon the said tubular frame. For the above operation a wrench may be used upon the square portion 16 of the cap 6. The stud 11 is now inserted into the cap 6 as shown in Figs. 1 and 2 and by means of a hand wrench engaging the square portion 10, the screw 9 may be turned in a manner to withdraw from the post 12, which will result in lengthening the jack and thereby the frame of the motor-cycle will be elevated. In this manner it is obvious that the front wheel of a motor-cycle may be raised off the ground and the frame thereof may be held with sufficient rigidity to remain in its upright position while repairs are being made thereon. After said repairs have been completed and the jack has been removed from the frame of the machine, it may be taken apart for the purpose of economizing space in carrying. This is accomplished by removing the screw 14 and turning the screw 9 into the post 12. It is now apparent that the dismantled jack is composed of the three units shown in Figs. 3, 4 and 5.

I claim:—

1. A motor-cycle jack arranged in three units, the first unit consisting of a transverse foot bar, the second unit consisting of a post and a screw fitted in said post and the third unit consisting of a cap, a nut attached to said cap by the threaded portion thereof and a pair of clamping jaws pivotally connected to said nut, the second and third units being arranged with stud and socket for rapid assembling of the units.

2. A motor-cycle jack comprising a post, a foot transversely attached to said post, a screw adjustable in said post and having its upper end provided with a stud, a cap arranged with socket to fit said stud and having its upper portion threaded, the nut 3 being formed of one piece of metal and provided with laterally extending lugs and clamping jaws pivotally connected to said lugs.

CHARLES MOSCHEL.

Witnesses:
 CHESTER W. WOOD,
 LOUIS MOSCHEL.

Copies of this patent may be obtained for five cents each, by addressing the "Commissioner of Patents, Washington, D. C."